US012651883B2

(12) United States Patent
Shang et al.

(10) Patent No.: US 12,651,883 B2
(45) Date of Patent: Jun. 9, 2026

(54) PASSIVE HIGH ENERGY Q-SWITCHED LASER SYSTEM WITH OPTICALLY SYNCHRONIZED MULTI-STAGE/MULTI-PASS AMPLIFICATION

(71) Applicant: Candela Corporation, Marlborough, MA (US)

(72) Inventors: Xiaoming Shang, Lexington, MA (US); Zhi Huang, Sudbury, MA (US); Junjie Zeng, Cambridge, MA (US); Kevin Schomacker, Maynard, MA (US)

(73) Assignee: Candela Corporation, Marlborough, MA (US)

( * ) Notice: Subject to any disclaimer, the term of this patent is extended or adjusted under 35 U.S.C. 154(b) by 1035 days.

(21) Appl. No.: 17/837,883

(22) Filed: Jun. 10, 2022

(65) Prior Publication Data

US 2023/0402813 A1 Dec. 14, 2023

(51) Int. Cl.
| | |
|---|---|
| *H01S 3/00* | (2006.01) |
| *H01S 3/092* | (2006.01) |
| *H01S 3/094* | (2006.01) |
| *H01S 3/106* | (2006.01) |
| *H01S 3/1115* | (2023.01) |

(Continued)

(52) U.S. Cl.
CPC .......... *H01S 3/1115* (2013.01); *H01S 3/0064* (2013.01); *H01S 3/092* (2013.01); *H01S 3/094038* (2013.01); *H01S 3/094049* (2013.01); *H01S 3/094061* (2013.01); *H01S 3/1061* (2013.01); *H01S 3/1312* (2013.01);

*H01S 3/1611* (2013.01); *H01S 3/1633* (2013.01); *H01S 3/2316* (2013.01); *H01S 3/2333* (2013.01)

(58) Field of Classification Search
CPC ...... H01S 3/1115; H01S 3/0064; H01S 3/092; H01S 3/094038; H01S 3/094049; H01S 3/094061; H01S 3/1061; H01S 3/1312; H01S 3/1611; H01S 3/1633; H01S 3/2316; H01S 3/2333
See application file for complete search history.

(56) References Cited

U.S. PATENT DOCUMENTS

| | | | |
|---|---|---|---|
| 2007/0263677 A1* | 11/2007 | Tanaka | H01S 3/127 |
| | | | 372/17 |
| 2014/0219299 A1 | 8/2014 | Burkholder et al. | |

(Continued)

OTHER PUBLICATIONS

International Search Report and Written Opinion for PCT application No. PCT/US2023/024407 mailed Sep. 25, 2023, 6 pages.

*Primary Examiner* — Mark Hellner
(74) *Attorney, Agent, or Firm* — Polsinelli PC

(57) ABSTRACT

A sub-nanosecond laser system is disclosed. The sub-nanosecond laser system may include: a pump laser source operable to generate a pump laser beam having a pump wavelength; a first pump beam splitter operable to receive the pump laser beam and split the pump laser beam into at least a first split pump laser beam and a second split pump laser beam; a passively Q-switched seed laser operable to receive the first split pump laser beam and generate a seed laser beam; and an amplifier assembly operable to receive the second split pump laser beam and the seed laser beam. The amplifier assembly may include one or more amplifiers arranged in series in a multi-stage configuration, arranged in a multi-pass configuration, or a combination thereof.

32 Claims, 9 Drawing Sheets

(51) Int. Cl.
_H01S 3/131_ (2006.01)
_H01S 3/16_ (2006.01)
_H01S 3/23_ (2006.01)

(56) References Cited

U.S. PATENT DOCUMENTS

2017/0317465 A1* 11/2017 Bhawalkar ........ H01S 3/094069
2017/0358898 A1* 12/2017 Taira .................... H01S 3/2316
2018/0375278 A1* 12/2018 Brunne ................ H01S 3/0064
2020/0251876 A1    8/2020 Bhawalkar et al.
2025/0096517 A1*  3/2025 Khatsevich ........... H01S 3/1611

* cited by examiner

PASSIVE HIGH ENERGY Q-SWITCHED LASER SYSTEM WITH OPTICALLY SYNCHRONIZED MULTI-STAGE/MULTI-PASS AMPLIFICATION

FIELD

The present system relates to passive high energy Q-switched laser system and in particular to passive high energy Q-switched laser systems with optically synchronized multi-stage/multi-pass amplification.

BACKGROUND

Lasers are used in numerous applications in industry, research, and medicine. Of special interest are lasers generating high energy and short duration pulses, for example, nanosecond and sub-nanosecond pulses. Such lasers would facilitate microprocessing applications of materials with high precision. Such lasers could also address a number of scientific and technological applications, as well as certain medical procedures, where the short interaction time with tissue can reduce heating effects, increase mechanical stresses, and improve the interaction quality.

Q-switched solid-state lasers are currently used to generate short duration laser pulses. These pulses typically have durations as short as a few nanoseconds. More commonly, an active optical component (acoustic optic or electro optic) is involved to generate Q-switched pulses. However, the pulse duration of an actively Q-switched laser is limited to a few nanoseconds or longer due to the limitation of fast switching time of active Q-switcher as well as larger physical size leading to longer cavity length. To further reduce the pulse duration, either a mode locking laser or a special type of Q-switched laser, commonly called microchip lasers will be used. Although mode locking is capable of generating ultrashort laser pulses, its cavity involves complex optical arrangements and is vulnerable to environment perturbation. Furthermore, the typical pulse energy generated from a mode locking resonator is on the order of nanojoule (nJ). In order to generate millijoule energy for meaningful applications, a regenerative amplifier which involves complex optical arrangement as well as precise electronic synchronization, makes the whole system bulky, expensive, and less reliable. Passively Q-switched short cavity laser may offer a compact and cost-effective alternative to generate pulses on the sub-nanosecond regime. A typical Q-switched short cavity laser consists of a laser medium, a saturable absorber as a passive Q-switcher and two cavity mirrors (high reflector and output coupler). The cavity is designed in such a way that crystal lengths are minimized, therefore the cavity length is on the order of millimeters. The short cavity lengths result in extremely short cavity lifetimes, and the possibility of much shorter Q-switched pulses. With a high energy pump source in combination of saturable absorber with low initial transmission, the generation of >mJ is possible. It has been demonstrated that Q-switched short cavity lasers can produce output pulses shorter than 150 ps, as short as large mode-locked lasers produce.

Since the energy from a Q-Switched short cavity oscillator is high enough (on the millijoule level), there is no need to introduce a complicated amplifier system (i.e., regenerative amplifier) to gain significantly large amplification factor for practical applications as a mode locking laser does. Instead, Master Oscillator Power Amplifier (MOPA) systems are typically used to generate sub-nanosecond, high-energy laser pulses. MOPA systems, especially ones with high amplifier gain, are sensitive to parasitic reflections, which can lead to problems of self-lasing. Self-lasing may severely limit the amplification achievable in the power amplifier. A single stage amplifier with single pass amplification is a simple configuration. However, it is problematic to extract the high energy (>1 J). With a single pass or single stage amplifier, the amplifier has to be pumped strongly in order to store higher gain for amplification. In the meantime, the higher gain built in the amplifying medium tends to facilitate the generation of amplified spontaneous emission (ASE) or self lasing which in return depletes the gain and limits amplified output energy.

BRIEF DESCRIPTION OF THE DRAWINGS

For a more complete understanding of this disclosure and its features, reference is now made to the following description, taken in conjunction with accompanying drawings, in which like reference numerals denote like elements.

DETAILED DESCRIPTION

Figures 1, 2:
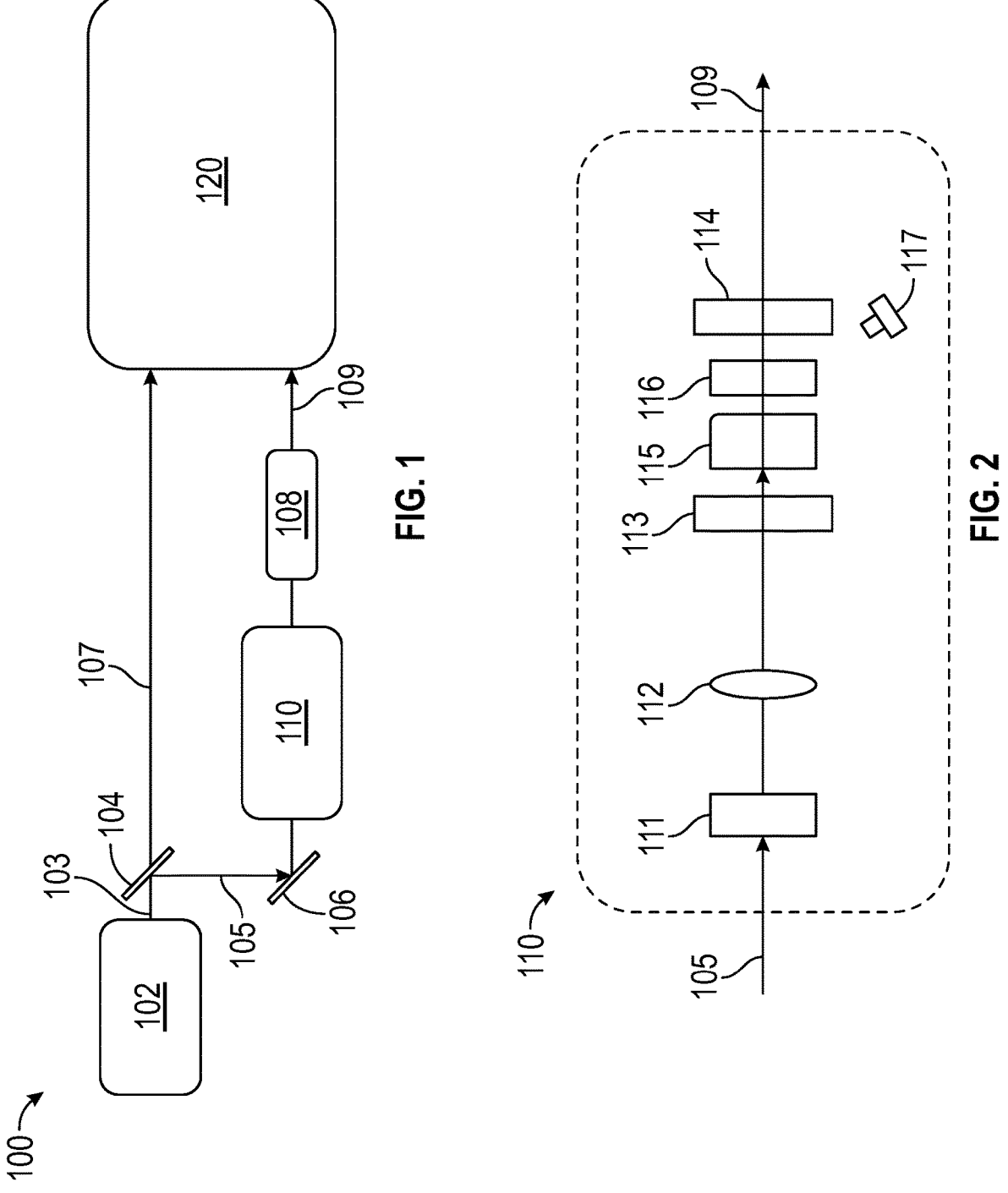
FIG. 1 is an example of a sub-nanosecond laser system with an optically synchronized multi-stage/multi-pass amplifier assembly.
FIG. 2 is an example of a passively Q-switched short cavity seed laser.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout the above disclosure will now be presented.

As used herein, "about" refers to numeric values, including whole numbers, fractions, percentages, etc., whether or not explicitly indicated. The term "about" generally refers to a range of numerical values, for instance, ±0.5-1%, ±1-5% or ±5-10% of the recited value, that one would consider equivalent to the recited value, for example, having the same function or result.

The term "coupled" is defined as connected, whether directly or indirectly through intervening components, and is not necessarily limited to physical connections. The connection can be such that the objects are permanently connected or releasably connected.

The term "substantially" is defined to be essentially conforming to the particular dimension, shape or other word that substantially modifies, such that the component need not be exact.

The terms "comprising," "including" and "having" are used interchangeably in this disclosure. The terms "comprising," "including" and "having" mean to include, but not necessarily be limited to the things so described. The term "consisting essentially of" is more limiting than "comprising" but not as restrictive as "consisting of." Specifically, the term "consisting essentially of" limits membership to the specified materials or steps and those that do not materially affect the essential characteristics of the claimed invention. The terms "a," "an," and "the" are understood to encompass the plural as well as the singular.

The terms "high-energy, sub-nanosecond laser" or "sub-nanosecond laser" as used herein, may refer to a laser that can provide an energy of 0.1 to 10 J with pulse duration of 10 to 900 psec. In general, a high-energy, sub-nanosecond laser can provide, for example, more effective micro machining, scientific spectroscopy, and medical treatments than a nanosecond laser commonly used. Accordingly, availability of a high-energy, sub-nanosecond laser may facilitate improvement of the existing applications and support development of new laser applications.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Disclosed herein is a sub-nanosecond laser system having a passively Q-switched seed laser and an amplifier assembly. The laser system described herein may overcome one or more of the issues described herein above regarding previous Q-switched lasers by using multi-stage or multi-pass amplifiers in the amplifier assembly.

Multi-stage amplification involves two or more amplifiers arranged in series and separated by isolators. For such a MOPA system, instead of having pump energy deposited into a single laser medium, the strong pump energy is distributed to multiple amplifier media, therefore ASE or self-lasing process may be mitigated. So, it can be a relatively simple and reliable solution to achieve high energy amplification. For a multiple-pass MOPA system, the gain can be efficiently extracted and used for amplification of the seed laser since the seed beam travels back and forth through the amplifying medium for multiple times. The effective gain extraction will suppress the unwanted ASE or self lasing to deplete the gain. Therefore, it can be a compact and cost-effective approach.

Usually, a MOPA with multi-stage amplifiers include at least three pump sources with one pump source pumping the master oscillator and the other pump sources pumping the power amplifiers. Pumping can include flashlamps or other light sources. For the case of commonly used multi-pass or multi-stage MOPA systems, multiple separate pump sources are used. For proper MOPA operation, the pumping sources and Q-switched operation must be closely synchronized. The synchronization, however, requires complicated electronic systems. Any electronic noise or fluctuation may cause significant unwanted energy variation. Furthermore, the use of complex electronics for timing synchronization may increase the complexity and cost of the system. The laser system described herein provides optical synchronization of a single pump laser to pump the seed laser, and the multi-pass and multi-stage amplifiers, thus avoiding all these issues. In addition, the laser system with a single pump laser may be less expensive than laser systems having a separate pump laser configured to pump the seed laser and separate pump laser(s) configured to pump the amplifier system.

The MOPA laser system disclosed herein and the method thereof implement optically synchronized multi-stage/multi-pass amplification seeded with a short cavity Q-switched laser to generate Joule level sub-nanosecond laser beams. The whole MOPA system includes one passively Q-switched laser with a cavity length of a few millimeters acting as a seed laser and followed by two or more amplifiers arranged in series or multi-pass configurations, or the combination of multi-pass and multi-stage amplifiers. In the disclosed MOPA laser system, there are no active components involved to implement proper laser operation. Therefore, it is an all-passive approach. The seed laser can generate milli-joule level laser pulses with near perfect beam quality and pulse durations as short as 50-150 ps. One or more isolators may be positioned in between the seed laser and the amplifier assembly. In an example, one isolator may be positioned between the seed laser and the amplifier assembly. In a multi-stage system, an additional isolator may be used in between two neighboring stages. The isolators are operable to block any unwanted feedback from the current stage to the previous stage next to it in order to prevent optical damage or malfunction of passively Q-switching timing. One single pump source is used to pump both the seed laser and amplifiers. Therefore, the synchronization of seed laser with multi-stage amplifiers is automatically implemented optically.

Among some of the advantages of the disclosed approach are: an all passive approach, optical synchronization for proper function of multi-stage/multi-pass amplification, self-energy compensation, reliable performance, and/or energy scaling. For example, the disclosed laser system may have a much higher energy stability compared to an electronically synchronized amplifier system and may have less performance dependence on environmental variations (i.e., temperature, electronic noises, etc.). It may also help reduce the COGs by eliminating any expensive optics and their expensive electronics drivers for implementing temporal synchronization.

Figure 10A:
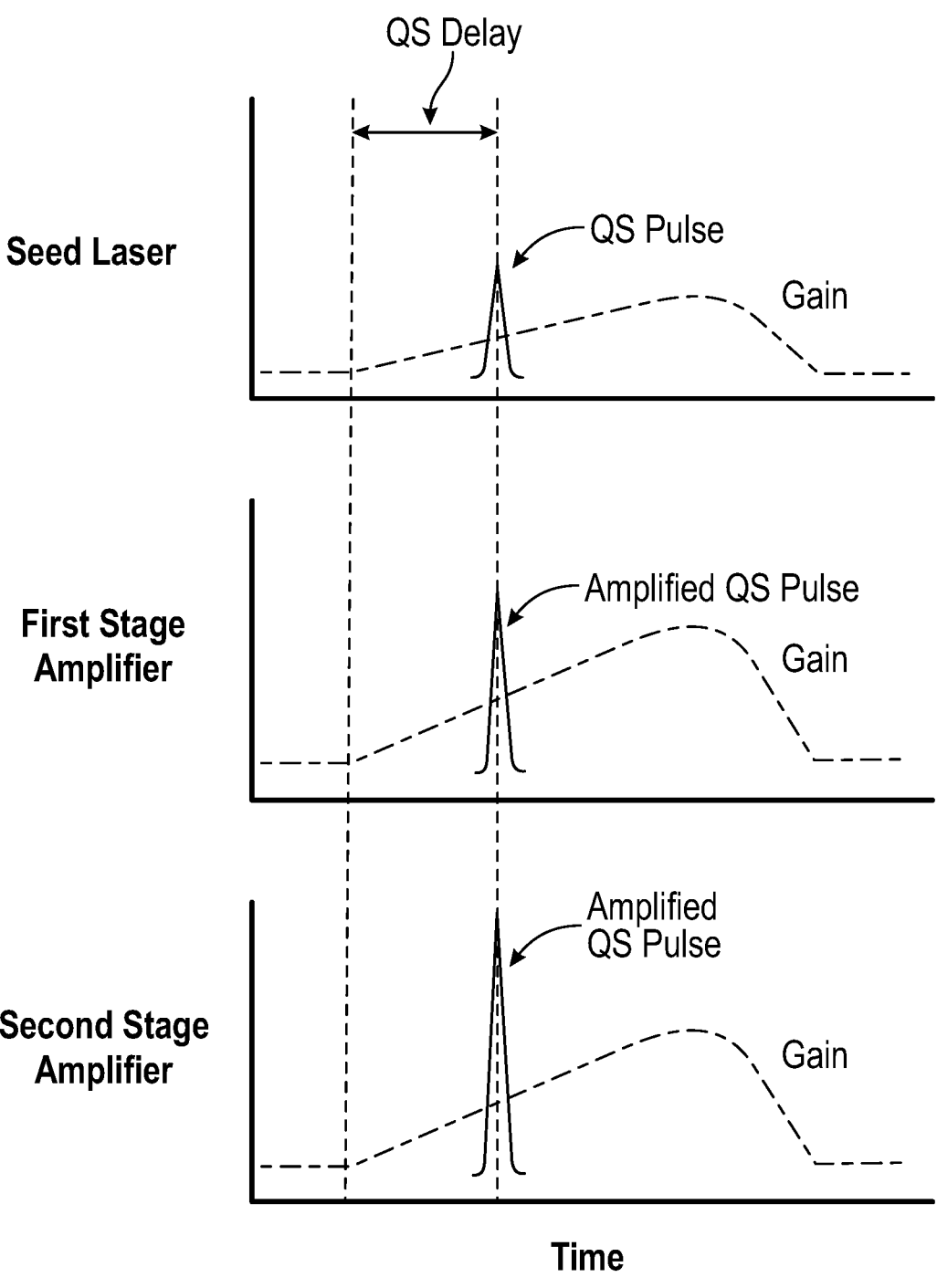
FIG. 10A an example of self energy stabilization enabled by optical synchronization of passively QS seed laser with dual stage amplifiers at higher overall pump energy.
Figure 10B:
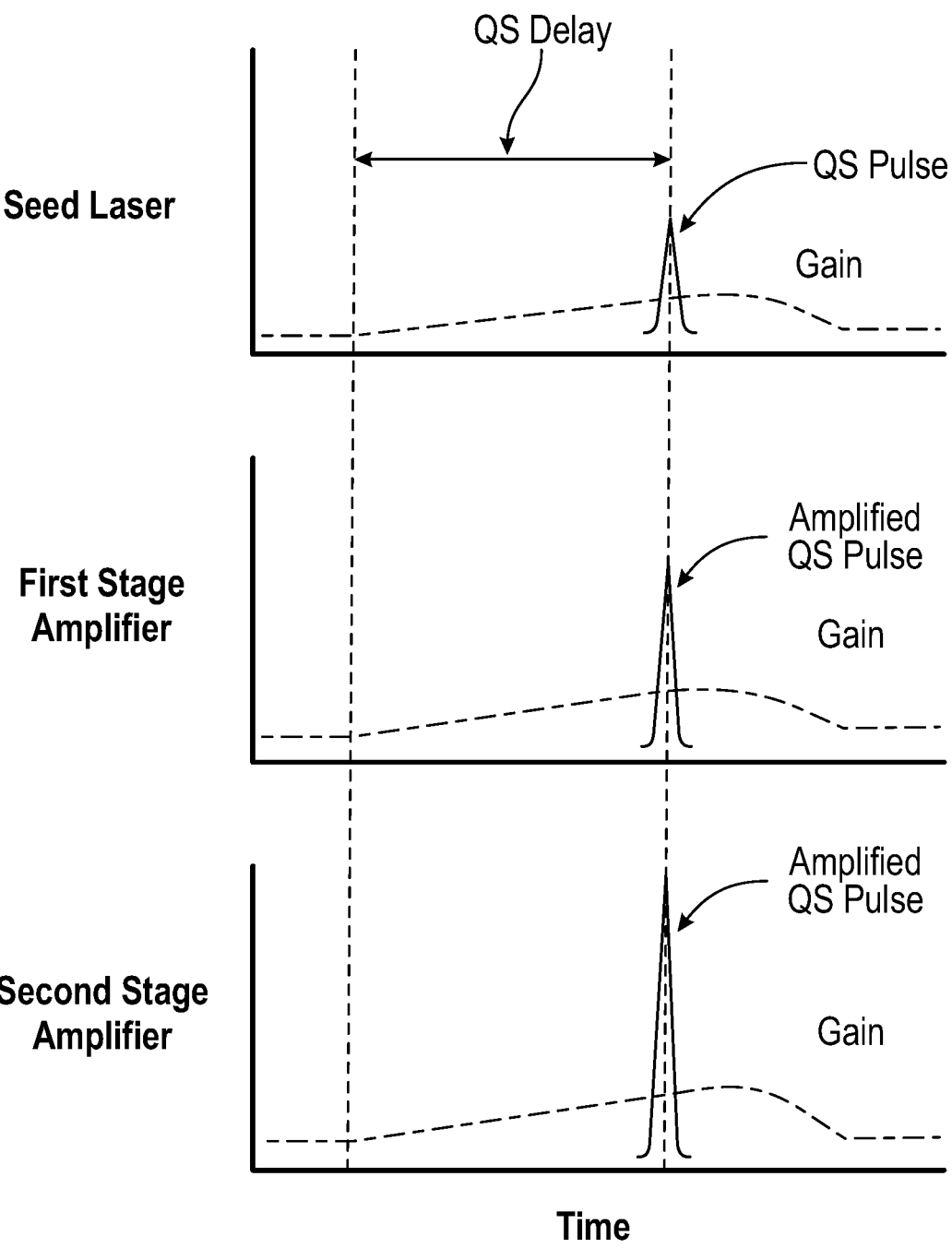
FIG. 10B is an example of self energy stabilization enabled by optical synchronization of passively QS seed laser with dual stage amplifiers at lower overall pump energy.

The all-passive approach means there is no active component used in the system. Q-switching is achieved with a passive attenuator, i.e., a saturable absorber. No electronic drivers are needed for timing synchronization of the seed laser pulse with the amplifiers. Optical synchronization means a single pump source is used for both the seed laser and amplifiers, which makes it possible to implement timing synchronization optically without introducing any electronic components. This also allows for proper function of multi-stage/multi-pass amplification. Self-energy compensation means the optical synchronization may help mitigate any amplified output energy variation due to the pump energy fluctuation. As shown in FIG. 10A, a higher pump energy will result in shorter time for the stored energy to overcome the Q-switched threshold to generate a Q-switched laser pulse from the seed laser. For the amplifier, shorter Q-switching delay time helps balance the higher gain in the amplifying media due to the higher pumping energy. As a result, the available stored energy for extraction may be the same and may not generate larger amplified energy. On the other hand, if the pump energy is lower, as shown in FIG. 10B, the longer QS delay time will allow for enough time for energy storage in the amplifying medium to cancel out the gain decrease. So, such an optically synchronization of passively Q-switching with the amplifiers acts as energy self-stabilizing mechanism to mitigate pump laser energy fluctuation. Reliable performance means in comparison to an electronically synchronized MOPA system, the all passive optically synchronized system is insensitive to electronic noise as well as less venerable to the environment change. Energy scaling is provided by the modularized amplifier configuration for the multi-stage amplifier assembly. Since each stage can be considered as an independent amplifier, it may be easier to implement energy scaling by adding more stages of amplifiers without complicating the system set up (in particular synchronization) and alignment of the previous stages.

FIGS. 1-8 illustrate various exemplary embodiments of a high energy, sub-nanosecond laser system. The disclosed high energy, sub-nanosecond laser system 100 includes a pump laser source 102 operable to generate a pump laser beam having a pump wavelength, a first pump beam splitter 104 operable to receive the pump laser beam 103 and split the pump laser beam into at least a first split pump laser beam 105 and a second split pump laser beam 107, a passively Q-switched seed laser 110 operable to receive the first split pump laser beam 105 and generate a seed laser beam 109, and an amplifier assembly 120 operable to receive the second split pump laser beam 107 and the seed laser beam 109, the amplifier assembly 120 comprising one or more amplifiers. The one or more amplifiers may be arranged in series in a multi-stage configuration, arranged in a multi-pass configuration, or a combination thereof. The first split pump laser beam 105 and the second split pump laser beam 107 are simultaneously delivered to both the seed laser 110 and the amplifier assembly 120 for automatic temporal synchronization of the seed laser and the amplifier assembly optically.

In addition, the system 100 may further include pump beam splitting optics, such as a beam splitter 104, one or more steering mirrors 106 at the pump wavelength, and an isolator 108 inserted in between the seed laser 110 and amplifier assembly 120. FIG. 1 illustrates a typical all passive high energy laser system 100 with an amplifier assembly 120 optically synchronized with a single pump laser source 102. For practical reasons, for a multi-stage amplification assembly, two stage or three stage amplifiers may be used.

Pump Laser

In an embodiment, a high energy pulsed laser is used to provide a common pump laser source 102 to pump the disclosed high energy (Joule level) sub-nanosecond laser system 100 with multi-stage/multi-pass amplifiers. More specifically, the pump laser source 102 may pump the seed laser 110 and each individual amplifier in the amplifier assembly 120 simultaneously enabling automatic synchronization of the passively Q-switched seed laser 110 with all amplifiers.

The pump laser source 102 may be operable to generate a pump laser beam 103 having a pump wavelength at a pump energy and be pulsed for a pump pulse duration. At the pump wavelength, gain medium 115 in the seed laser 110 and amplifiers may absorb substantial pump energy. In various embodiments, for neodymium (Nd) doped gain medium, the pump wavelength may range from about 730 nm to about 900 nm. The choice of pump wavelength depends on a few factors, such as high enough absorption by gain medium, available pump source, as well as consideration of reducing quantum defect. In at least one example, the pump wavelength may be about 750 nm. The pump pulse duration may be chosen to be comparable to the fluorescence lifetime of the gain medium in the seed and amplifiers in order for efficient pumping. In some embodiments where Nd doped gain medium is used, the pump pulse duration may be about 200 µs to about 500 µs. In at least one example, the pump pulse duration may be about 250 µs. The pump energy of the pump laser source 102 may be high enough to enable passively Q-switching of the seed laser 110 as well as supply sufficient energy storage in the gain media in each amplifier stage to achieve efficient amplification. In various embodiments, the pump energy may range from about 50 mJ to about 10 J. For example, the pump laser source emits pump laser beam pulses with a pump energy greater than or equal to 1 J, greater than or equal to 2 J, greater than or equal to 3 J, greater than or equal to 4 J, greater than or equal to 5 J, greater than or equal to 6 J, greater than or equal to 7 J, greater than or equal to 8 J, or less than or equal to 10 J. In at least one example, the pump energy may be about 8 J.

In one example, pump laser source 102 may be flashlamp pumped Alexandrite laser emitting an about 753 nm pulsed laser. In other examples, the gain medium for the seed laser or amplifier may include neodymium-doped crystals or a ceramic material. For neodymium-doped crystals or ceramic material (i.e., yttrium aluminum garnet (YAG), yttrium aluminum perovskite (YAP), or yttrium lithium fluoride (YLF)), their lifetimes are around 230-500 µs, which gives a pump pulse duration roughly on the same range. For a Joule level MOPA laser system based on Nd:YAG, around 8 J pump energy may be needed.

In some embodiments, the pump laser source 102 may be fiber coupled or free space propagate to the disclosed MOPA system.

Passively Q-Switched Seed Laser

In an embodiment, the passively Q-switched seed laser 110 may include a cavity comprising a gain medium 115 and a passive attenuator (e.g. saturable absorber 116).

In some embodiments, the passively Q-switched seed laser 110 may further include a pair of laser mirrors (e.g. a high reflector 113 and an output coupler 114) to form a laser resonator. The passively Q-switched seed laser 110 may further include an attenuator 111 for adjusting pump energy and a pump beam shaping lens(es) 112 for producing proper pump spot size in the gain medium. The attenuator 111 is positioned in the split pump beam path 105 before the pump beam enters the passively Q-switched laser resonator. For example, FIG. 2 shows the passively Q-switched seed laser 110 cavity may be formed by a high reflector laser mirror 113 and an output coupler laser mirror 114 with a gain medium 115 and a saturable absorber 116 in between them. Unlike an actively Q-switched laser, there is no active Q-switching mechanism (i.e., acousto-optic, or electro-optic) in a passively Q-switched laser resonator, which requires external electronic driver. Instead, Q-switching is implemented with a passive attenuator/optic (e.g. the saturable absorber 116) acting a fast-switching optical shutter. Passive Q-switching may offer better advantages to generate shorter pulses (i.e., sub-nanosecond) over actively Q-switching due to smaller physical size and faster switching time of the saturable absorber compared to its compartment, active counterpart. Furthermore, a highly doped laser medium is normally used to reduce the thickness of the gain material leading to shorter cavity length. In some embodiments, the exit surface of the gain medium may be coated with highly reflective coating at the pump wavelength to implement double pass pumping geometry to further reduce the gain medium length leading to even shorter cavity length. The passively Q-switched short cavity seed laser 110 is arranged to be a linear cavity to achieve compactness for generating sub-nanosecond laser pulses. In various embodiments, the passively Q-switched seed laser cavity may have a length of less than 10 mm, less than 8 mm, less than 6 mm, or less than 4 mm.

In an embodiment, the gain medium 115 and passive attenuator 116 may be bonded together to form a monolithic structure. The front surface of the gain medium 115 may be coated with a highly reflective coating and the back surface of the passive attenuator 116 may coated with a partially reflective coating.

Typically, as seen in FIG. 1, a small amount of pump energy may be split from the pump laser beam 103 with a beam splitter 104 to create a first split pump laser beam 105. A second split pump laser beam 107 with a large portion of the energy may be delivered to the amplifier assembly 120. For example, the pump laser beam 103 may be split with 10% or less of the pump laser beam 103 energy being directed to the seed laser 110 as the split pump laser beam 105 and 90% or more of the pump laser beam 103 energy being directed to the amplifier assembly 120 as the split pump laser beam 107. In some embodiments, the split pump laser beam 105 is deflected with a mirror 106 to direct it to the seed laser 110. Beam splitter 104 may be any suitable beam splitter, such as, for example, a cube beam splitter, a partial reflector, a high refractive index plate, and a fiber splice. In one exemplary embodiment, the beam splitter 104 may be an uncoated sapphire plate or window.

Referring back to FIG. 2, the split pump laser beam 105 may be received by the seed laser 110 and may pass through an attenuator 111 to adjust the pump energy to the seed cavity followed by a pump beam shaping lens(es) 112 to provide the appropriate pump spot size in the gain medium 115. The attenuator 111 may be variable neutral density filters or a rotating polarizer cube. It is used to adjust the Q-switched pulse time delay relative to the start of the pump laser pulse.

The seed laser beam 109 exiting the seed laser 110 may have an energy of about a few hundred µJ to about 20 mJ. The seed laser beam may be sub-nanosecond laser pulses with a pulse duration as short as about 50 ps or 100 ps. The seed laser beam may have a seed wavelength ranging from about 1 µm to about 1.1 µm.

In some embodiments, a fast photodetector 117 may be placed close to or in the seed laser 110 to monitor the Q-switched pulse and its time delay. Once a Q-switched pulse is detected, the photodetector 117 may provide a feedback signal to the pump laser source 102 and trigger the pump laser source 102 to shut down to prevent the double or multiple pulsing. In some examples, the photodetector 117 may be in communication with a control system for the pump laser source 102. The communication may be wireless.

Several factors may affect Q-switched pulse energy. These include pumping spot size in the gain medium 115, initial transmission of the saturable absorber 116, and reflectivity of the output coupler laser mirror 114. In one example, the seed laser 110 may be an Alexandrite laser pumped Nd:YAG laser with $Cr^{4+}$:YAG as a passive Q-switch. With a pump pulse of about 50 mJ and ~250 µs and proper laser cavity parameters (i.e., cavity length, pumping spot size, initial transmission of Cr4+:YAG, and reflectivity of output coupler), the Q-switched Nd:YAG short cavity laser can generate milli-joule level sub-nanosecond laser pulses with a pulse duration as short as about 100 ps. In another example, the laser medium may be Nd:YAP or Nd:YLF.

Multi-Stage Amplifier Assembly

In an embodiment, the one or more amplifiers of the amplifier assembly 120 may be arranged in a multi-stage configuration comprising a first stage and a second stage. The amplifier assembly 120 may further include a seed laser beam shaping lens 121 and a second pump beam splitter 122 operable to split a portion of the second split pump laser beam 107 to pump a first amplifier 126 in the first stage while a remaining portion of the second split pump laser beam 107 is steered into a second amplifier 128 in the second stage. In some embodiments, the amplifier assembly 120 may further include one or more dichroic mirrors 124 and 131 to combine the pump beam and seed beam/pre-amplified seed beam.

Referring back to FIG. 1, pulses of the sub-nanosecond seed laser beam 109 may propagate through an isolator 108 (e.g., a Faraday isolator) before it is sent to the multi-stage amplifier assembly 120 for amplification. The use of an isolator 108 may prevent any feedback from the amplifier assembly 120 from being sent back to the seed laser 110. If feedback from the amplifier assembly 120 is sent back to the seed laser 110, it may cause optical damage or Q-switching timing fluctuation. The multi-stage amplifier assembly 120 may also be operable to receive a large portion of the pump energy (e.g. the split pump laser beam 107) from the same pump laser source 102 used to pump the seed laser 110.

FIGS. 3-6 represent examples of an all-passive sub-nanosecond MOPA system 100 with dual stages of amplifiers in an amplifier assembly 120. In some embodiments, there may be two inputs for the amplifier assembly 120, i.e., from the seed laser beam 109 after the isolator 108 and the split pump beam laser beam 107 after beam splitter 104. The sub-nanosecond seed laser beam 109 generated from the seed laser 110 propagates through an optical isolator 108 and then enters the first stage of the amplifier assembly 120.

Figures 5, 6:
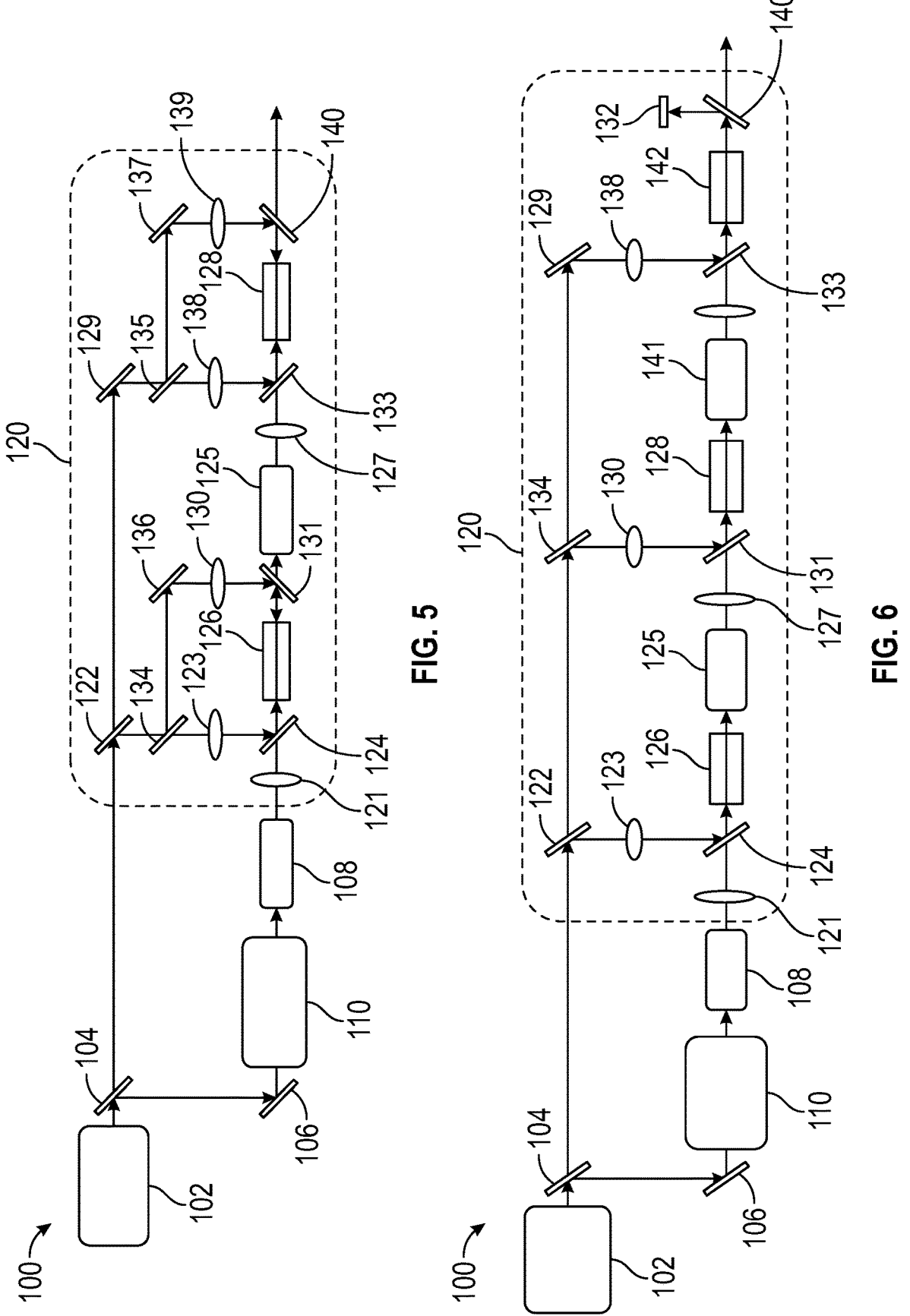
FIG. 5 is an example of an optically synchronized MOPA system with dual amplifier stages and a double-end pumping configuration.
FIG. 6 is an example of an optically synchronized MOPA system with three amplifier stages and a forward pumping configuration.

In an embodiment, a seed laser beam shaping lens 121 may be positioned in front of the amplifying laser medium of the first stage amplifier 126 to produce a preferable seed beam spot size and divergence to achieve better spatial overlap with the second split pump laser beam 107 in the amplifying laser medium (i.e. first stage amplifier 126). The remaining large portion of pump energy (i.e. second split pump laser beam 107) after splitting for pumping the seed laser 110 by beam splitter 104 is utilized as a single pump source to energize the amplifier assembly 120. The amplifier assembly 120 may include an amplifier beam splitter 122 to split a portion of the incoming second split pump laser beam 107 energy to pump the first stage while the remaining pump energy is steered into the second stage amplifier 128. The pump energy ratio for the two stages may be set for optimal final extraction efficiency. In terms of pump laser beam propagation direction relative to the input seed laser, three examples of the configurations are shown in FIGS. 3-5.

Figures 3, 4:
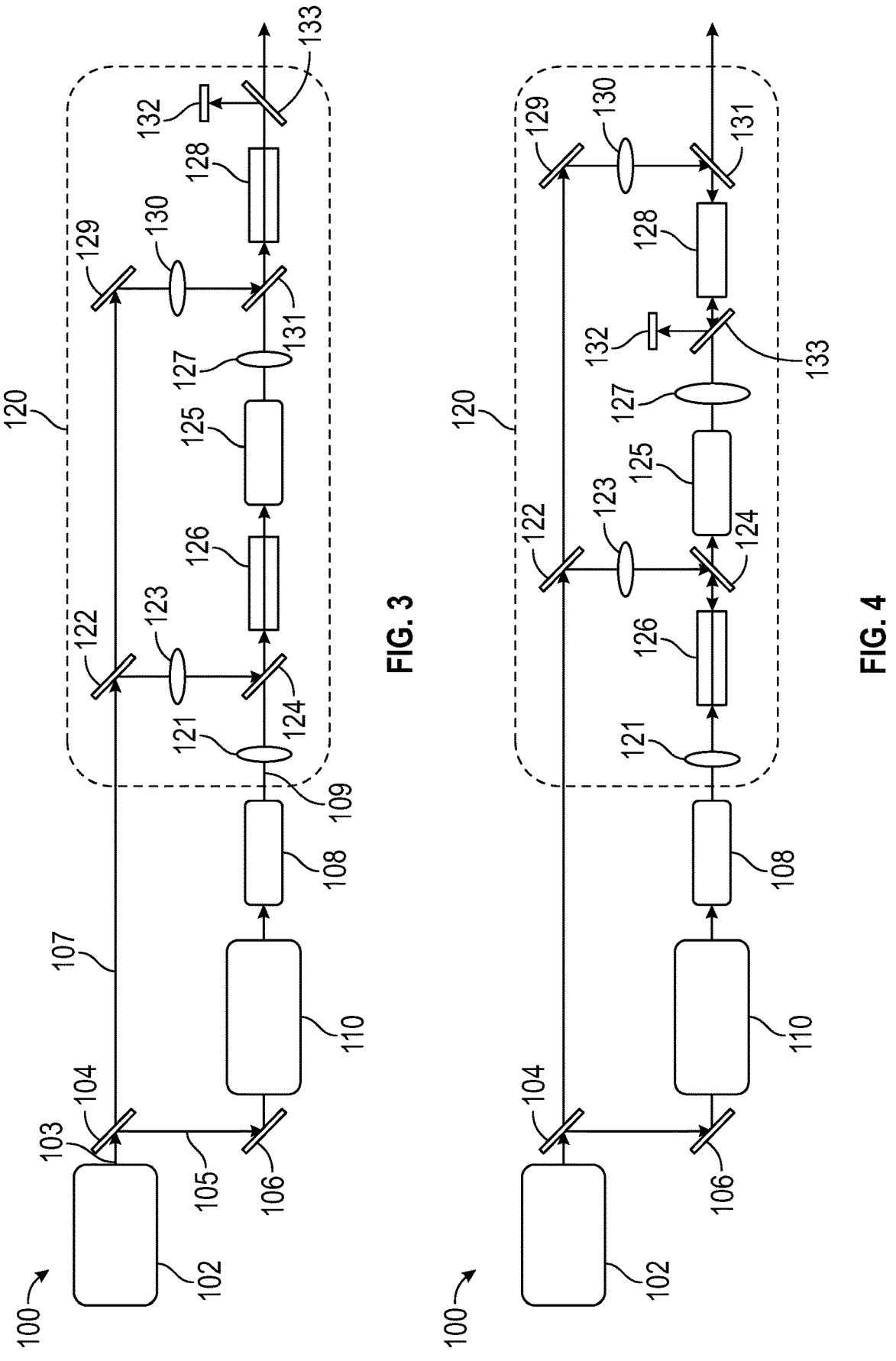
FIG. 3 is an example of an optically synchronized MOPA system with dual amplifier stages and a forward pumping configuration.
FIG. 4 is an example of an optically synchronized MOPA system with dual amplifier stages and a backward pumping configuration.

FIG. 3 depicts a front end pumping configuration in which the pump laser beams propagate forward through the amplifying media (i.e., first stage amplifier 126 and second stage amplifier 128) collinear with the seed laser for the first stage and the amplified seed laser out of the first stage for the second stage, respectively. A first pump beam shaping lens 123 may be used to shape the beam to achieve optimized spatial mode match between the second split pump laser beam 107 and the seed laser beam 109 in the amplifying medium of the first stage amplifier 126. A second pump beam shaping lens 130 may be introduced to provide the mode match between the pre-amplified seed laser and pump beam for the second stage in the second stage amplifier 128. A first dichroic mirror 124 and a second dichroic mirror 131 may be used to combine the pump beams with the seed laser beam for the first stage and pre-amplified seed laser for the second stage, respectively. They are coated to be highly reflective at the pump wavelength and highly transmissive at seed laser wavelength.

In some embodiments, an additional optical isolator 125 may be inserted in between the first stage amplifier 126 and the second stage amplifier 128 to avoid any cross talk in between two amplifiers causing unwanted optical damages and lower exaction efficiency. To block any residual pump energy leaking through the amplifying medium before coming out of the system, the amplifier assembly may include one more dichroic mirror 133 together with a beam dump 132 so that only the amplified sub-nanosecond laser beam is the single output.

In another embodiment, another pumping laser configuration is shown in FIG. 4. In this embodiment, the pump beam enters the amplifier from the back-end surface of the amplifying media so that the pump beam is counter-propagated through the amplifying medium (i.e. first stage amplifier 126 or second stage amplifier 128) with the seed laser beam or the pre-amplified seed laser.

In some embodiments, the amplifying medium may be also pumped from both the front end and the back end to provide more uniformed pump energy distribution, therefore providing uniform gain distribution across the crystal/amplifying medium length, as shown in FIG. 5. For each amplifying stage, the incoming split pump laser beam 107 that is spilt by the amplifier beam splitter 122 is further split into two portions with equal or different energy ratio by a second beam splitter 134 or a third beam splitter 135. Pump beam shaping lenses 123 and 130 may be configured to produce the proper spot size and beam divergence to achieve optimized mode match for the forward and backward directions with the incoming seed beam for the first stage. The same functionality is implemented by pump beam shaping lenses 138 and 139 for the second stage. Dichroic mirrors 124 and 133 are operable to combine the pump beam with seed laser beam for the first stage, and combine the pump beam with the amplified seed laser beam for the second stage, respectively. Another set of dichroic mirrors 131 and 140 may be used to send another portion of the pump beam to the back surface of the amplifying media of the first stage amplifier 126 and the second stage amplifier 128 as well as transmit the pre-amplifier seed laser beam, and amplified seed laser beam, respectively.

In an embodiment, the multi-stage amplifier assembly 120 may be comprised of more than 2 stages of amplifiers. In various embodiments, the amplifier assembly 120 may include 1, 2, 3, or 4 amplifiers. In at least one example, the amplifier assembly 120 may include three stages comprising three amplifiers. As an example, FIG. 6 shows a three-stage amplifier assembly 120 with forward pumping configuration. The pump beam splitters for the amplifiers, 122 and 134, may be used to split the pump beam energy available for the amplifier assembly into three portions to pump three amplifiers, i.e., a first stage amplifier 126, a second stage amplifier 128, and a third stage amplifier 142. Pump beam shaping lenses 123, 130, and 138 are positioned in the pump beam paths to implement mode matches of the pump beams with their corresponding seed laser beams for three stages. The same functions may be implemented with seed laser beam shaping lenses 121, 127, and 136 for the seed laser beams. Similar to the dual stage systems, the other pumping configurations (i.e., backward pumping, and double end pumping) may be relevant to this configuration as well.

Multi-Pass Amplification

Figure 7:
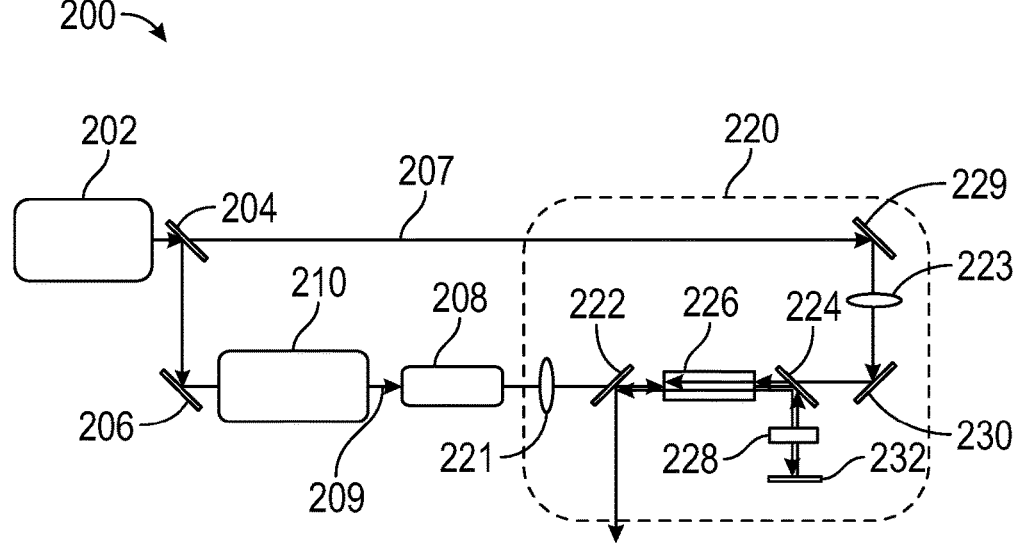
FIG. 7 is an example of an optically synchronized MOPA system with a double pass amplifier and a backward pumping configuration.
Figure 8:
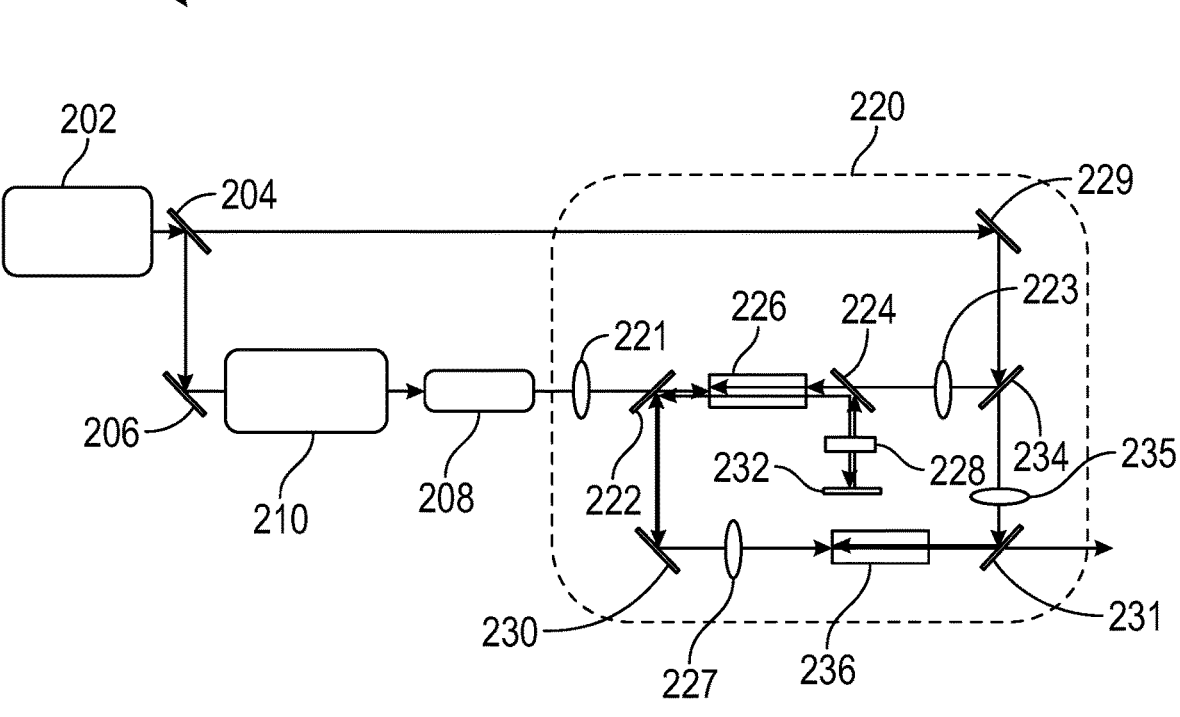
FIG. 8 is an example of an optically synchronized MOPA system with combined double pass and dual stage amplifiers and a backward pumping configuration.

FIGS. 7 and 8 are example optically synchronized MOPA systems with a multi-pass amplifier assembly and a backward pumping configuration in a single stage (FIG. 7) or a dual stage (FIG. 8). In some embodiments, the high energy laser system 200 includes a passively Q-switched short cavity seed laser 210, a multi-pass amplifier assembly 220, and a pump laser 202. In addition, it may further include pump beam splitting optics 204, a steering mirror 206, and an isolator 208 inserted in between the seed laser 210 and amplifier assembly 220. The amplifier assembly 120 may include one or more amplifiers 226, 236, one or more seed laser beam shaping lenses 221, 227, one or more pump beam shaping lenses 223, 235, a polarizing optic 222, one or more dichroic mirrors 224, 231, one or more steering mirrors 229, 230, 232, and a quarter waveplate 228. In an embodiment, the amplifier assembly 120 comprises one amplifier and is arranged in a multi-pass configuration. FIG. 7 illustrates a typical all passive high energy laser system 200 with a multi-pass amplifier assembly 220 optically synchronized with a single pump laser 202.

Similar to a multi-stage amplifier assembly, a multi-pass amplifier assembly 220 receives a first split pump laser beam 207 and a seed laser beam 209 after the isolator 208. In this configuration, only one laser amplifying medium is used (e.g. amplifier 226). The seed laser beam 209 is arranged to pass through the amplifier 226 back and forth for multiple times to gain efficient amplification before it is ejected out of the amplifier 226. The seed laser beam 209 travels back and forth in the amplifying medium collinearly or spatially separated. For a collinear multiple pass system, the control of the output beam relies on the polarization differentiation. One example is a collinear double pass amplifier, shown in FIG. 7. The seed laser 210 and isolator 208 are set in such a way that the seed laser beam 209 after the isolator 208 is P polarized. A polarizing optic 222 is operable to transmit the P polarized seed laser through it and to propagate through the amplifier 226 as the first pass before it is reflected by a dichroic mirror 224. The reflected amplified seed laser beam further passes through a quarter waveplate 228 and gets reflected in exactly opposite propagation direction by a mirror 232, which may be flat or curved. When the amplified seed laser beam passes through the quarter waveplate 228 a second time, its polarization is turned by 90 degree and becomes a S polarized beam, which is redirected by a dichroic mirror 224 into the amplifier 226 one more time as a second pass to get further amplification. The S polarized beam, after the second pass through the amplifying medium, gets reflected by the polarizing optic 222. It should be noted that the polarizing optic 222 may be a thin film polarizer or a polarizing cube. The dichroic mirror 224 may act as a beam combiner to transmit the pump beam and combine it with the reflected seed beam so that the two beams propagate toward the amplifying medium collinearly. The multi-pass amplifier assembly also include one or more pump beam steering mirrors 229, 230 and a pump beam shaping lens 223.

In some cases where the further amplification is needed, an amplifier assembly 220 with combined multi-pass and multi-stage amplifiers is involved. For example, the amplifier assembly 220 may include two or more amplifiers arranged in a combined multi-pass and multi-stage configuration. In some embodiments, the first amplifier and/or the second amplifier are pumped from a front end or a back end of amplifier medium. In some embodiments, the first amplifier and/or the second amplifier are pumped from both a front end and the back end to provide a uniform pump energy distribution. In other embodiments, the amplifier assembly 120 includes a double pass amplifier in a first stage followed by second stage single pass amplifier. FIG. 8 illustrates an example of an amplifier assembly 220 including a double pass amplifier 226 as first stage followed by second stage amplifier 236. Similar to a typical double stage amplification system, this hybrid amplification system uses a double pass amplifier to replace a typical single pass amplifier as first stage. One common feature for all the configurations disclosed is that the pump beams for each stage or each pass as well as the seed laser are derived from the same pump laser, which is necessary to implement optical synchronization and all-passive operation of the laser system.

The above-mentioned configurations are not exclusive and are provided as examples. The other configurations for the multi-stage/multi-pass MOPA system with optically synchronization shall be considered as part of this disclosure.

Optical Synchronization

Figure 9:
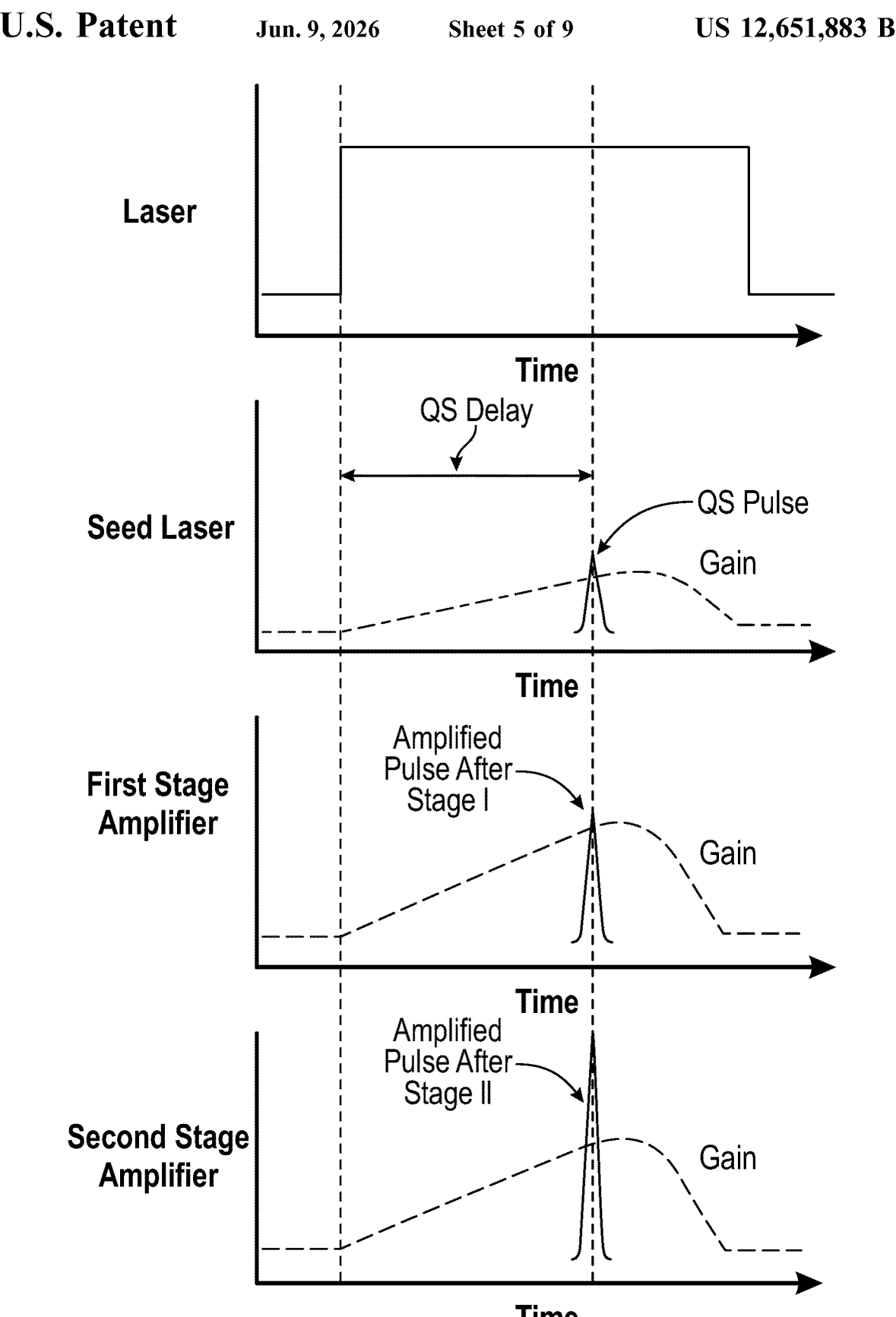
FIG. 9 shows the principal of optical synchronization for an all-passive MOPA system with dual-stage amplifiers.

An advantage of the sub-nanosecond laser system is that a common pump laser optically implements the synchronization of the passively Q-switched laser with its multiple stage/multi-pass amplifier assembly. As an example, FIG. 9 illustrates the principal on how the synchronization works for a dual stage amplifier assembly. The start of pump laser pulse sets a time zero for the clock of the whole system. As pumping is going on, the gains for the seed laser gain medium, and two amplifiers start building up simultaneously. If there is no Q-switching occurring, all the gain curves will reach the maximum value and then deplete to zero at the same time. The magnitude of the gain value for a giving gain medium depends on its pump energy and doping concentration. The time needed to reach the peak of the gain curve is determined by the fluorescence lifetime of the gain medium as well as other depletion mechanisms, such as amplified spontaneous emission (ASE) or self lasing.

In the presence of a passively Q-switching mechanism in a seed laser, a short Q-switched pulse may be generated when the stored gain value overcomes the cavity losses. The Q-switching delay is the time needed for the gain of seed gain medium surpasses the losses. In some embodiments, control of amplified laser energy may be implemented by adjusting the Q-switching time delay of the seed laser while maintaining the constant pump energy for each amplifying stage to achieve a stable thermal profile in the amplifying medium. The Q-switched delay time may be varied by adjusting the attenuation of the pump energy to the seed laser.

The sub-nanosecond Q-switched pulse acts as an end time point for gain building up for the amplifying gain media. And this end time point can be considered roughly same for all the amplifying media. Although the optical path for each stage may be different in as large as meters, the light takes roughly the same time to travel through each amplifying stage when comparing on a few hundred microsecond scale set by the fluorescence time of the gain media. The gain stored in each amplifying medium within the Q-switching delay time may be available for extraction. Thus, the synchronization may be realized by the pump laser pulse with its rising edge defining the time zero and the passively Q-switched pulse setting the finish time. In some embodiments, the same principal may be applied to the multi-pass amplification as well the combined multi-pass and multi-stage amplification systems.

Energy Control by Adjusting Q-Switched Time Delay

Most commonly, the output energy adjustment for a MOPA system is mainly implemented by adjusting the pump power/energy to the amplifier. However, such an energy control scheme may suffer several issues. First, for a MOPA system which requires large range of energy tunability, the pump power/energy to the amplifier has to be varied drastically from low to high. As a result, the thermal lensing effect and depolarization will be varied significantly and lead to problems for some applications where the stable beam polarization is required. Among some examples are harmonic generation, pumping anisotropic laser medium, polarization sensitive measurement, etc. The second issue comes from the instability of amplified laser energy at a very low energy level. Low output energy involves low pumping energy. However, most commonly used pump lasers may become less stable, and their energy fluctuates much more at very low energy compared to higher energy level. So, the large fluctuation of pump energy will directly translate into unstable energy of an amplified laser at the low end of the energy level. Furthermore, unstable pump energy will cause the fluctuation of Q-switched seed laser pulse delay relative to the start of pump pulse, which will lead to further unstable output energy.

To overcome these issues, control of pump energy to the seed rather pump energy to the amplifier may implement energy control while maintaining the constant pump energy for the amplifier assembly. In this case the pump energy to the amplifier is set to a level where the stable operation can be achieved. One example is to operate the pump at the highest constant energy level to pump amplifier.

Figure 11A:
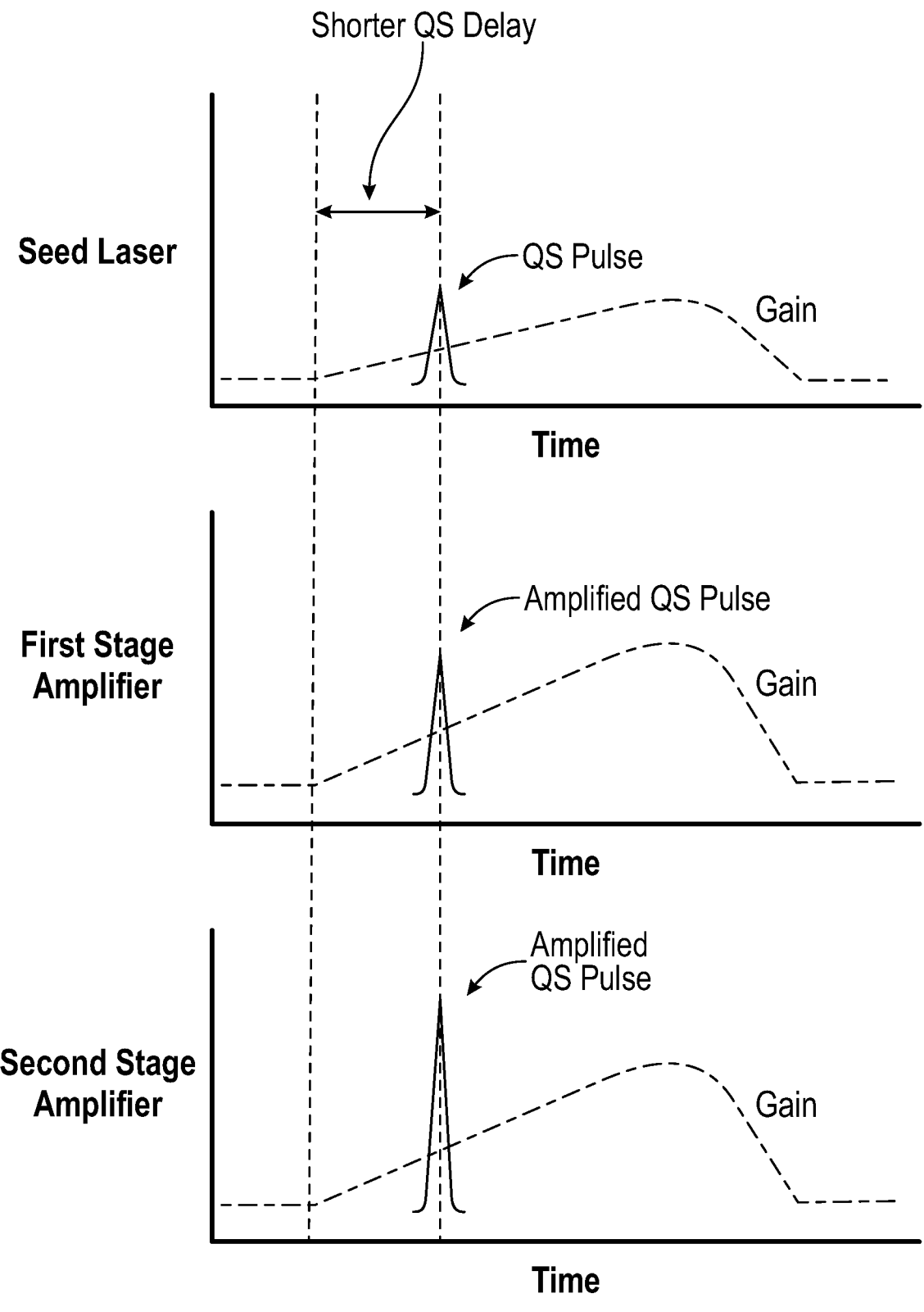
FIG. 11A is an example graph showing the energy control by adjusting the Q-switching delay time in combination of optical synchronization for higher seed pump energy and constant pump energy for amplifiers.
Figure 11B:
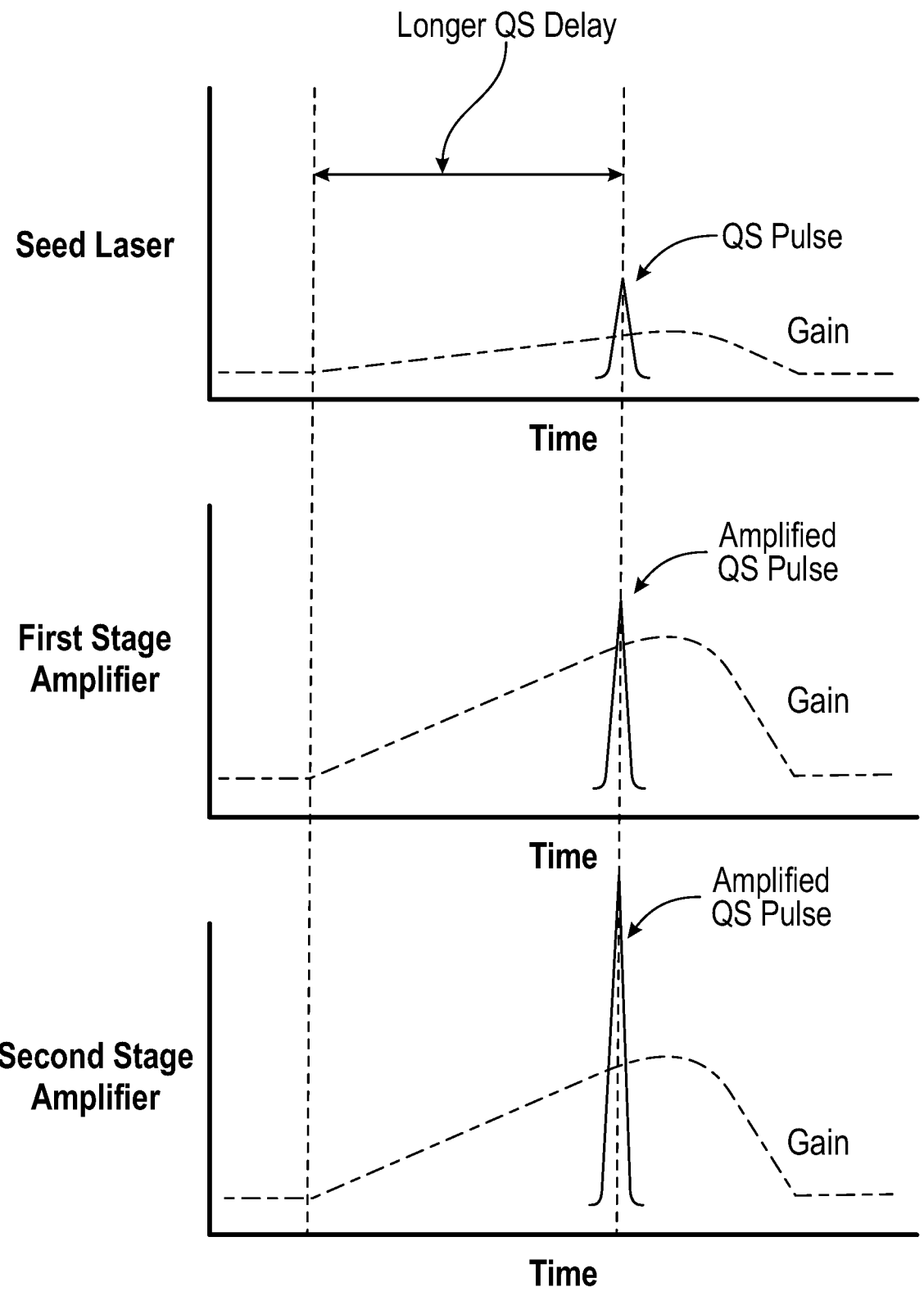
FIG. 11B an example graph showing the energy control by adjusting the Q-switching delay time in combination of optical synchronization for lower seed pump energy and constant pump energy for amplifier.

In an embodiment, the optical synchronization of the disclosed laser system may implement energy control by adjusting Q-switching time delay while maintaining the same pump energy for each amplifying stage. As shown in FIG. 2, an attenuator is placed in the pump beam path of the seed laser for adjusting the pump beam energy. When the pump beam energy to the seed laser is set to a lower value, more time is needed to generate a Q-switched pulse, therefore Q-switching delay is longer. Due to the optical synchronization, the longer Q-switching delay will result in larger gain storage available for extraction in the amplifying media leading to higher amplified output energy, as shown in FIG. 11B. In contrast, a lower output energy may be obtained by adjusting the Q-switching delay time to a short time with a higher pumping energy to the seed as illustrated in FIG. 11A. FIGS. 11A and 11B illustrate the amplified energy adjustment through the control of Q-switched seed laser pulse delay by adjusting the pump energy to the seed for a dual-stage amplifier assembly. It should be noted that the gain profiles in the amplifying media stay the same due to the constant pumping energy to the amplifier assembly, but the gain in the seed laser varies as a result of the chance of the pump energy to the seed laser. The same principal can be applied to an amplifier assembly which consists of a single pass single stage amplifier, or a multi-pass amplifier as well as a combination of multiple and multi-pass amplifiers.

It will be appreciated by persons skilled in the art that the present disclosure is not limited to what has been particularly shown and described hereinabove. Rather, the scope of the laser system includes both combinations and sub-combinations of various features described hereinabove as well as modifications and variations thereof which would occur to a person skilled in the art upon reading the foregoing description and which are not in the prior art.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

Numerous examples are provided herein to enhance the understanding of the present disclosure. A specific set of statements are provided as follows.

Statement 1. A sub-nanosecond laser system comprising: a pump laser source operable to generate a pump laser beam having a pump wavelength; a first pump beam splitter operable to receive the pump laser beam and split the pump laser beam into at least a first split pump laser beam and a second split pump laser beam; a passively Q-switched seed laser operable to receive the first split pump laser beam and generate a seed laser beam, the passively Q-switched seed laser comprising a cavity comprising a gain medium and a passive attenuator; and an amplifier assembly operable to receive the second split pump laser beam and the seed laser beam and generate an amplified laser beam, the amplifier assembly comprising one or more amplifiers, wherein the one or more amplifiers are arranged in series in a multi-stage configuration, arranged in a multi-pass configuration, or a combination thereof, wherein the first split pump laser beam and the second split pump laser beam are simultaneously delivered to both the seed laser and the amplifier assembly for automatic temporal synchronization of the seed laser and the amplifier assembly optically.

Statement 2. The system of statement 1, wherein the one or more amplifiers are arranged in a multi-stage configuration comprising a first stage and a second stage, and wherein the amplifier assembly further comprises a seed laser beam shaping lens and a second pump beam splitter operable to split a portion of the second split pump laser beam to pump a first amplifier in the first stage while a remaining portion of the second split pump laser beam is steered into a second amplifier in the second stage.

Statement 3. The system of statement 2, wherein the amplifier assembly further comprises one or more dichroic mirrors.

Statement 4. The system of statement 2, wherein the pump laser beam enters the first amplifier and/or the second amplifier from a front end surface of the amplifier so that the pump laser beam is collinearly propagated through the first or second amplifier with the seed laser beam or a pre-amplified seed laser beam.

Statement 5. The system of statement 2, wherein the pump laser beam enters the first amplifier and/or the second amplifier from a back end surface of the amplifier so that the pump laser beam is counter-propagated through the first or second amplifier with the seed laser beam or a pre-amplified seed laser beam.

Statement 6. The system of statement 5, wherein the first amplifier and/or the second amplifier are pumped from both a front end surface and the back end surface to provide a uniform pump energy distribution across an amplifying medium length.

Statement 7. The system of statement 2, wherein the amplifier assembly further comprises a third stage comprising a third amplifier.

Statement 8. The system of statement 1, wherein the amplifier assembly comprises one amplifier and is arranged in a multi-pass configuration.

Statement 9. The system of statement 8, wherein the seed laser beam is arranged to pass through the amplifier back and forth for multiple times to gain efficient amplification before it is ejected out of the amplifier.

Statement 10. The system of statement 9, wherein the seed laser beam travels back and forth in the amplifier collinearly or spatially separated.

Statement 11. The system of statement 1, wherein the amplifier assembly comprises two or more amplifiers arranged in a combined multi-pass and multi-stage configuration.

Statement 12. The system of statement 11, wherein the amplifier assembly comprises a double pass amplifier in a first stage followed by second stage amplifier.

Statement 13. The system of statement 1, wherein the passively Q-switched seed laser cavity has a length of less than 10 mm.

Statement 14. The system of statement 1, wherein the seed laser is operable to generate milli-joule level laser pulses and pulse durations of 100 ps or less.

Statement 15. The system of statement 1, further comprising one or more isolators positioned in between the seed laser and the amplifier assembly.

Statement 16. The system of statement 1, wherein the amplifier assembly further comprises an additional isolator in between two neighboring stages.

Statement 17. The system of statement 1, wherein the passive attenuator is a saturable absorber.

Statement 18. The system of statement 1, wherein the passively Q-switched seed laser further comprises a pair of laser mirrors to form a laser resonator.

Statement 19. The system of statement 18, wherein the pair of laser mirrors comprise a high reflector and an output coupler.

Statement 20. The system of statement 1, wherein the passively Q-switched seed laser comprises a separate gain medium and passive attenuator.

Statement 21. The system of statement 1, wherein the passively Q-switched seed laser comprises a gain medium and passive attenuator which are bonded together to form a monolithic structure.

Statement 22. The system of statement 21, wherein a front surface of the gain medium is coated with highly reflective coating and a back surface of the passive attenuator is coated with partially reflective coating.

Statement 23. The system of statement 1, wherein the passively Q-switched seed laser further comprises an attenuator for adjusting pump energy and a pump beam shaping lens.

Statement 24. The system of statement 23, wherein the attenuator comprises variable neutral density filters or a rotating polarizer cube.

Statement 25. The system of statement 1, wherein the passively Q-switched seed laser further comprises a photo-detector operable to: monitor a Q-switched pulse from the seed laser and its time delay; provide a feedback signal to the pump laser source; and trigger the pump laser source to shut down to prevent double or multiple pulsing.

Statement 26. The system of statement 1, wherein the pump laser source emits pump laser beam pulses with a pump energy greater than 1 J.

Statement 27. The system of statement 26, wherein the pump energy is high enough to enable passively Q-switching of the seed laser as well as supply sufficient energy storage in a gain medium in each amplifier to achieve efficient amplification.

Statement 28. The system of statement 26, wherein the pump laser beam pulses have a pulse duration of about 100-500 μs.

Statement 29. The system of statement 1, wherein the gain medium for the seed laser or amplifier comprises neodymium-doped crystals or a ceramic material.

Statement 30. The system of statement 29, wherein the gain medium is selected from the group consisting of yttrium aluminum garnet (YAG), yttrium aluminum perovskite (YAP), or yttrium lithium fluoride (YLF).

Statement 31. The system of statement 1, wherein the pump laser source is a flashlamp pumped Alexandrite laser emitting an about 753 nm pulsed laser beam.

Statement 32. The system of statement 1, wherein control of the amplified laser energy is implemented by adjusting a time delay of the seed laser while maintaining constant pump energy for each amplifying stage and achieving a stable thermal profile in the amplifying medium.

Statement 33. The system of statement 32, wherein the delay time is varied by adjusting attenuation of the pump energy to the seed laser.

What is claimed is:

1. A sub-nanosecond laser system comprising:
   a pump laser source operable to generate a pump laser beam having a pump wavelength;
   a first pump beam splitter operable to receive the pump laser beam and split the pump laser beam into at least a first split pump laser beam and a second split pump laser beam;
   a passively Q-switched seed laser operable to receive the first split pump laser beam and generate a seed laser beam, the passively Q-switched seed laser comprising a cavity comprising a gain medium and a passive attenuator; and an amplifier assembly operable to receive the second split pump laser beam and the seed laser beam and generate an amplified laser beam, the amplifier assembly comprising one or more amplifiers, wherein the one or more amplifiers are arranged in series in a multi-stage configuration, arranged in a multi-pass configuration, or a combination thereof,
   wherein the first split pump laser beam and the second split pump laser beam are simultaneously delivered to both the seed laser and the amplifier assembly for automatic temporal synchronization of the seed laser and the amplifier assembly optically, and
   wherein control of the amplified laser energy is implemented by adjusting a time delay of the seed laser while maintaining constant pump energy for each amplifying stage and achieving a stable thermal profile in the amplifying medium.

2. The system of claim 1, wherein the one or more amplifiers are arranged in a multi-stage configuration comprising a first stage and a second stage, and wherein the amplifier assembly further comprises a seed laser beam shaping lens and a second pump beam splitter operable to split a portion of the second split pump laser beam to pump a first amplifier in the first stage while a remaining portion of the second split pump laser beam is steered into a second amplifier in the second stage.

3. The system of claim 2, wherein the amplifier assembly further comprises one or more dichroic mirrors.

4. The system of claim 2, wherein the pump laser beam enters the first amplifier and/or the second amplifier from a front end surface of the first or second amplifier so that the pump laser beam is collinearly propagated through the first or second amplifier with the seed laser beam or a pre-amplified seed laser beam.

5. The system of claim 2, wherein the pump laser beam enters the first amplifier and/or the second amplifier from a back end surface of the first or second amplifier so that the pump laser beam is counter-propagated through the first or second amplifier with the seed laser beam or a pre-amplified seed laser beam.

6. The system of claim 5, wherein the first amplifier and/or the second amplifier are pumped from both a front end surface and the back end surface to provide a uniform pump energy distribution across an amplifying medium length.

7. The system of claim 2, wherein the amplifier assembly further comprises a third stage comprising a third amplifier.

8. The system of claim 1, wherein the amplifier assembly comprises one amplifier and is arranged in a multi-pass configuration.

9. The system of claim 8, wherein the seed laser beam is arranged to pass through the amplifier back and forth for multiple times to gain efficient amplification before it is ejected out of the amplifier.

10. The system of claim 9, wherein the seed laser beam travels back and forth in the amplifier collinearly or spatially separated.

11. The system of claim 1, wherein the amplifier assembly comprises two or more amplifiers arranged in a combined multi-pass and multi-stage configuration.

12. The system of claim 11, wherein the amplifier assembly comprises a double pass amplifier in a first stage followed by second stage amplifier.

13. The system of claim 1, wherein the passively Q-switched seed laser cavity has a length of less than 10 mm.

14. The system of claim 1, wherein the seed laser is operable to generate milli-joule level laser pulses and pulse durations of 100 ps or less.

15. The system of claim 1, further comprising one or more isolators positioned in between the seed laser and the amplifier assembly.

16. The system of claim 1, wherein the amplifier assembly further comprises an additional isolator in between two neighboring stages.

17. The system of claim 1, wherein the passive attenuator is a saturable absorber.

18. The system of claim 1, wherein the passively Q-switched seed laser further comprises a pair of laser mirrors to form a laser resonator.

19. The system of claim 18, wherein the pair of laser mirrors comprise a high reflector and an output coupler.

20. The system of claim 1, wherein the passively Q-switched seed laser comprises a separate gain medium and a separate passive attenuator.

21. The system of claim 1, wherein the gain medium and the passive attenuator are bonded together to form a monolithic structure.

22. The system of claim 21, wherein a front surface of the gain medium is coated with highly reflective coating and a back surface of the passive attenuator is coated with partially reflective coating.

23. The system of claim 1, wherein the passively Q-switched seed laser further comprises an attenuator positioned in the pump beam path before entering laser resonator for adjusting pump energy and a pump beam shaping lens.

24. The system of claim 23, wherein the attenuator comprises variable neutral density filters or a rotating polarizer cube.

25. The system of claim 1, wherein the passively Q-switched seed laser further comprises a photodetector operable to:
    monitor a Q-switched pulse from the seed laser and its time delay;
    provide a feedback signal to the pump laser source; and
    trigger the pump laser source to shut down to prevent double or multiple pulsing.

26. The system of claim 1, wherein the pump laser source emits pump laser beam pulses with a pump energy greater than 1 J.

27. The system of claim 26, wherein the pump energy is high enough to enable passively Q-switching of the seed laser as well as supply sufficient energy storage in a gain medium in each amplifier to achieve efficient amplification.

28. The system of claim 26, wherein the pump laser beam pulses have a pulse duration of about 100-500 μs.

29. The system of claim 1, wherein the gain medium for the seed laser or amplifier comprises neodymium-doped crystals or a ceramic material.

30. The system of claim 29, wherein the gain medium is selected from the group consisting of yttrium aluminum garnet (YAG), yttrium aluminum perovskite (YAP), or yttrium lithium fluoride (YLF).

31. The system of claim 1, wherein the pump laser source is a flashlamp pumped Alexandrite laser emitting an about 753 nm pulsed laser beam.

32. The system of claim 1, wherein the delay time is varied by adjusting attenuation of the pump energy to the seed laser.

* * * * *